(12) United States Patent  (10) Patent No.: US 7,829,266 B2
Deng et al.  (45) Date of Patent: Nov. 9, 2010

(54) MULTIPLE EXPOSURE TECHNIQUE USING OPC TO CORRECT DISTORTION

(75) Inventors: Yunfei Deng, San Jose, CA (US); Jongwook Kye, Pleasanton, CA (US); Ryoung-han Kim, San Jose, CA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 521 days.

(21) Appl. No.: 11/834,979

(22) Filed: Aug. 7, 2007

(65) Prior Publication Data

US 2009/0040483 A1 Feb. 12, 2009

(51) Int. Cl.
*G03F 7/00* (2006.01)
*G03F 1/00* (2006.01)
*G03C 5/00* (2006.01)

(52) U.S. Cl. .............................. 430/312; 430/5; 430/394

(58) Field of Classification Search ................. 250/548; 382/144; 430/5, 30, 311–313, 394; 716/19, 716/21

See application file for complete search history.

(56) References Cited

U.S. PATENT DOCUMENTS

| | | | |
|---|---|---|---|
| 5,858,620 A | | 1/1999 | Ishibashi et al. |
| 6,319,853 B1 | | 11/2001 | Ishibashi et al. |
| 6,563,127 B2 * | | 5/2003 | Lin et al. .................... 250/548 |
| 6,811,954 B1 * | | 11/2004 | Fukuda ........................ 430/311 |
| 6,942,958 B2 * | | 9/2005 | Chen et al. ................... 430/311 |
| 2004/0146808 A1 * | | 7/2004 | Dirksen et al. ............... 430/311 |
| 2004/0170906 A1 * | | 9/2004 | Chen et al. ...................... 430/5 |
| 2004/0248045 A1 * | | 12/2004 | Tanaka et al. ................ 430/312 |
| 2006/0222963 A1 * | | 10/2006 | Terhune .......................... 430/5 |
| 2007/0243492 A1 * | | 10/2007 | McElheny et al. ........... 430/316 |
| 2007/0275309 A1 * | | 11/2007 | Liu ................................ 430/5 |

OTHER PUBLICATIONS

Hiroko Nakamura, et al., "Contact Hole Formation by Multiple Exposure Technique in Ultra-low $k_1$ Lithography," Optical Microlithography XVII, 2004, pp. 255-263, Proceedings of SPIE vol. 5377.

\* cited by examiner

*Primary Examiner*—Stephen Rosasco
*Assistant Examiner*—Stewart A Fraser
(74) *Attorney, Agent, or Firm*—Ditthavong, Mori & Steiner, P.C.

(57) ABSTRACT

Accurate ultrafine patterns are formed using a multiple exposure technique comprising implementing an OPC procedure to form an exposure reticle to compensate for distortion of an overlying resist pattern caused by an underlying resist pattern. Embodiments include forming a first resist pattern in a first resist layer over a target layer using a first exposure reticle, forming a second exposure reticle by an OPC technique to compensate for distortion of a second resist pattern caused by the underlying first resist pattern, depositing a second resist layer on the first resist pattern, forming the second resist pattern in the second resist layer using the second exposure reticle, the first and second resist patterns constituting a final resist mask, and forming a pattern in the target layer using the final resist mask.

20 Claims, 9 Drawing Sheets

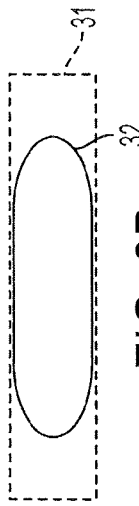
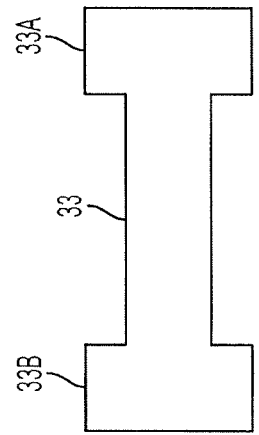
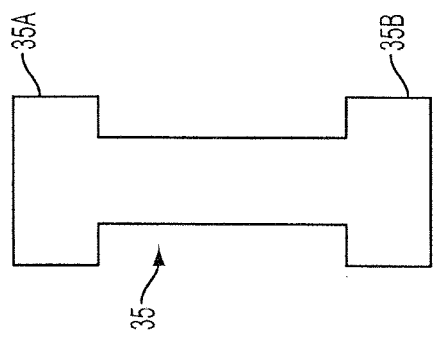
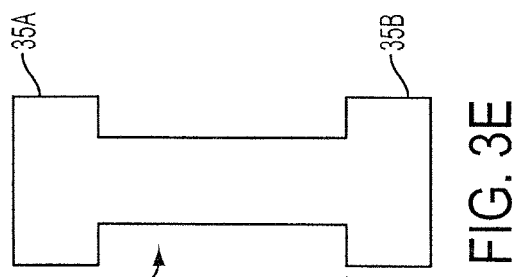
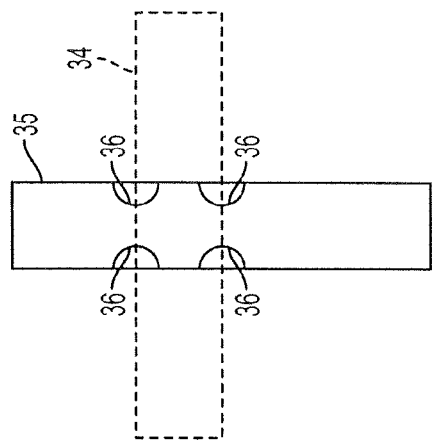

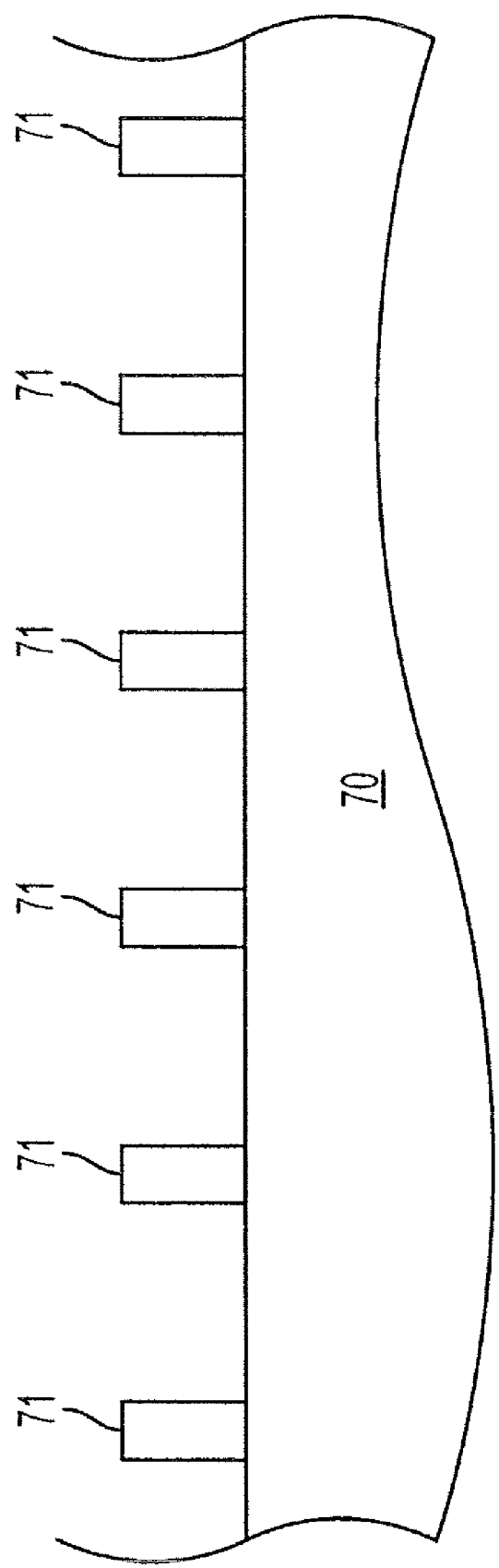

MULTIPLE EXPOSURE TECHNIQUE USING OPC TO CORRECT DISTORTION

FIELD OF THE INVENTION

The present invention relates to the fabrication of semiconductor devices having accurately formed ultrafine design features. The present invention is particularly applicable to fabricating semiconductor devices having high speed integrated circuits with design features in the deep sub-micron range in an efficient manner with increased manufacturing throughput.

BACKGROUND ART

The dimensions of semiconductor device features relentlessly plunge into the deep sub-micron range challenging conventional fabrication techniques. As critical dimensions shrink, it becomes increasingly more difficult to achieve high dimensional accuracy with high manufacturing throughput. The minimum feature size depends upon the chemical and optical limits of a particular lithography system, and the tolerance for distortions of the shape. In addition to the limitations of conventional lithography, the manufacturing costs attendant upon accurately forming ultrafine design features increase, thereby requiring advances in processing designed for efficient use of facilities and high manufacturing throughput.

As dimensions of feature sizes, such as lines or trenches decrease, low-k1 lithographic imaging is restrained by optical proximity effects to achieve dimensional accuracy, as by restraining low-k1 lithographic imaging to reach the diffractional limit, which is the foundational limit of a lithography system where k1=0.25. For example, when forming a line or trench, an exposure reticle 10 is formed as illustrated in FIG. 1A. However, when exposing an underlying resist layer to form the corresponding pattern, indicated by dashed line 11 (FIG. 1B), a pattern having shape 12 is formed, falling short of the desired pattern 11 due to optical proximity effects. There has evolved a method known as optical proximity correction (OPC) which basically involves repeated modification of the exposure reticle and repeated photoresist exposures until the actual pattern formed coincides with the desired design pattern. For example, in attempting to correct the undesired pattern 12 shown in FIG. 1B, a modified exposure reticle 13, shown in FIG. 1C, is formed using OPC, which modified exposure reticle 13 comprises enlarged end portions 13A and 13B. Upon photoresist exposure using modified exposure reticle 13, a pattern 14 is formed which proximates desired design pattern 11, as shown in FIG. 1D.

Double exposure techniques and spacer lithographic processes have also evolved. However, these techniques have not been completely successful and suffer from low manufacturing throughput, some techniques requiring the repeated use of several tools and frequent chemical mechanical polishing (CMP).

Accordingly, a need exists for methodology enabling the fabrication of semiconductor chips comprising devices having accurately formed features in the deep sub-micron range, such as design features less than 20 nm, including design features less than 15 nm, e.g., less than 10 nm. There exists a particular need for such methodology enabling the accurate formation of ultrafine design features with high efficiency and high manufacturing throughput.

DISCLOSURE OF THE INVENTION

An advantage of the present invention is a method of fabricating semiconductor devices having accurately formed features with dimensions in the deep sub-micron range.

Additional advantages and other features of the present invention will be set forth in the description which follows and in part will be apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a method of fabricating a semiconductor device, the method comprising: forming a first mask pattern in a first mask layer over a first target layer using a first exposure reticle; forming a second exposure reticle for a second mask pattern to be formed over the first mask pattern by implementing an optical proximity correction (OPC) technique to compensate for distortion of the second mask pattern caused by the first mask pattern; and forming a second mask pattern in a second mask layer over the first mask pattern using the second exposure reticle.

Another advantage of the present invention is a method of fabricating a semiconductor device, the method comprising forming a photoresist mask over a target layer, the photoresist mask comprising a plurality of superimposed submasks; and forming an exposure reticle for a submask using optical proximity correction (OPC) to compensate for distortion of the submask caused by an underlying submask.

A further advantage of the present invention is a method of forming a composite photoresist mask over a substrate, the method comprising: forming a first photoresist submask over the substrate using a first exposure reticle; forming an additional exposure reticle for at least one superimposed additional photoresist submask using optical proximity correction (OPC) to compensate for distortion of the at least one superimposed submask by an underlying submask; and forming the at least one superimposed additional photoresist submask on the first photoresist submask using the additional exposure reticle.

Embodiments of the present invention include employing OPC to compensate for optical proximity effects in addition to distortion, such as notching, caused by an underlying mask pattern. In accordance with embodiments of the present invention, an underlying submask is preserved by a UV curing or baking technique prior to depositing an overlying resist layer and forming a submask therein. Embodiments of the present invention include forming a photoresist mask comprising multiple submasks, and forming various types of patterns in an underlying substrate, such as closely spaced apart line patterns, intersecting line patterns, and openings, such as vias and/or contact holes.

Additional advantages of the present invention will become readily apparent to those skilled in the art from the following detailed description, wherein embodiments of the present invention are described, simply by way of illustration of the best mode contemplated for carrying out the present invention. As will be realized, the present invention is capable of other and different embodiments and its several details are capable of modifications in various obvious respects, all without departing from the present invention. Accordingly, the drawings and description are to be regarded as illustrative in nature, and not as restrictive.

BRIEF DESCRIPTION OF THE DRAWINGS

FIG. 3 schematically illustrates a double exposure method encountering a distortion problem apart from optical proximity effects.

FIGS. 7A through 7C schematically illustrate a problem attendant upon multiple exposure techniques in forming line patterns.

DESCRIPTION OF THE INVENTION

The present invention addresses and solves problems attendant upon fabricating semiconductor devices with accurately formed ultrafine design features less than 20 nm, such as less than 15 nm, e.g., less than 10 nm. These problems stem from dimensional restrictions imposed by the chemical and optical limits of conventional lithography systems, misalignment stemming from multiple exposure steps with intervening processing, and distortions of feature shape. Conventional fabrication techniques have been challenged to keep pace with the demands for accurately formed ultrafine design features, particularly in an efficient manner to enable high manufacturing throughput to remain competitive.

Conventional lithographic practices have fallen short of satisfying the relentless demand for accurately formed finer and finer design features, particularly in an efficient manner with increased manufacturing throughput, even when employing a conventional OPC technique. For example, in employing a single exposure technique to form an intersecting line mask pattern comprising horizontal member 21 and vertical member 22, as shown in FIG. 2A, distortion occurs such that the intersecting portion is distorted as illustrated by curved dashed lines 23A and 23B. Adverting to FIG. 2B, in attempting to form an intersecting line mask pattern comprising vertical component 24 and horizontal component 25, the intersection is distorted by dashed lines 26. The use of such distorted photoresist masks disadvantageously results in a variation in the critical dimension of the pattern ultimately formed in the underlying target layer.

Figure 1B:
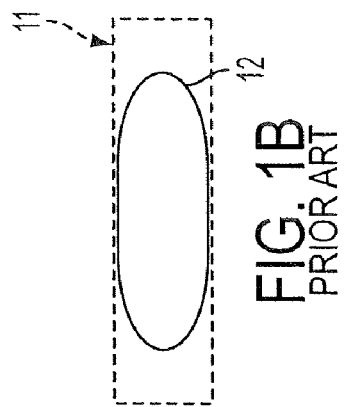
FIGS. 1A through 1D schematically illustrate sequential steps of a conventional OPC technique to correct for optical proximity effects.
Figure 1D:
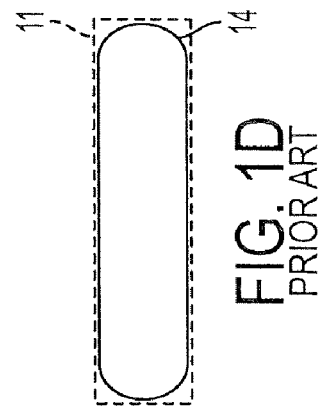
Figure 1A:
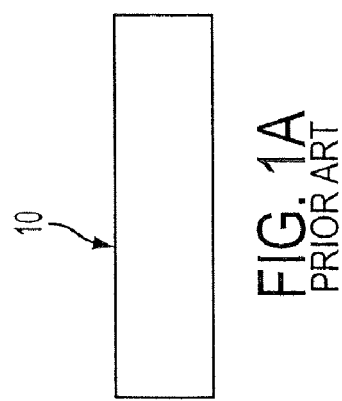
Figure 1C:
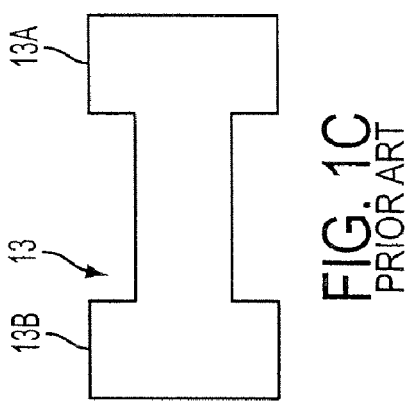
Figure 2B:
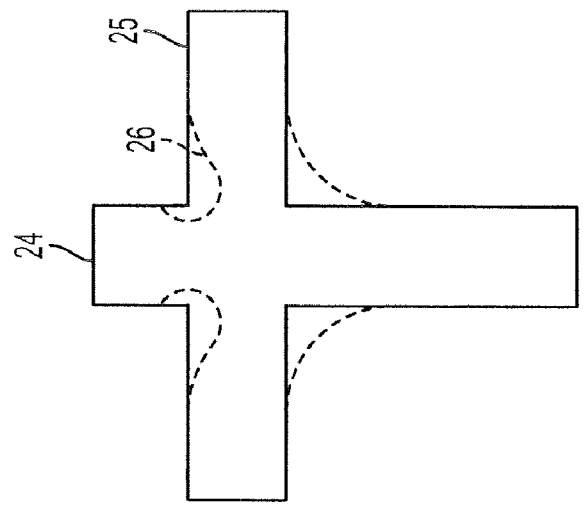
FIGS. 2A and 2B schematically illustrate problems attendant upon the formation of intersecting line patterns.
Figure 2A:
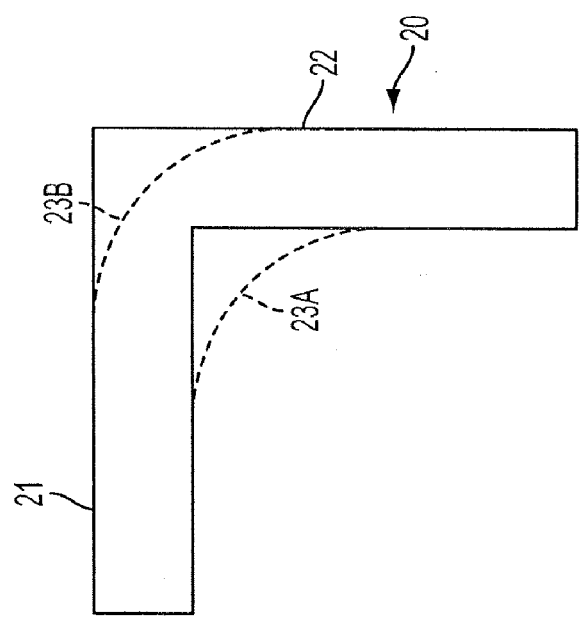

In attempting to form photoresist masks for intersecting line patterns, such as that illustrated in FIG. 2B, a double exposure technique was implemented using OPC to correct for optical proximity effects. However, this procedure did not prove successful, as shown in FIGS. 3A through 3F. Adverting to FIG. 3A, an initial exposure reticle 30 was formed to create a horizontal mask member illustrated by dashed line 31 in FIG. 3B. However, the resulting horizontal mask member, illustrated by solid line 32, was deformed by optical proximity effects. Accordingly, an OPC technique was employed to generate a modified exposure reticle 33 comprising enlarged end portions 33A and 33B, as illustrated in FIG. 3C. The modified exposure reticle 33 was used to form horizontal mask member 34, shown in FIG. 3B, proximating desired mask member 31. Adverting to FIG. 3C, a second modified exposure reticle 35 comprising enlarged end portions 35A and 35B was formed using OPC. The second modified exposure reticle 35 was then used to form vertical mask member 35 over horizontal mask member 34, to form intersecting line mask pattern shown in FIG. 3F, similar to that attempted in FIG. 2B using a single exposure technique. While OPC corrected optical proximity effects, different problems resulted when implementing a double exposure technique. It was found that when employing a double exposure technique using multiple superimposed layers, as in the technique illustrated in FIGS. 3A through 3F, a different type of problem resulted. As shown in FIG. 3F, distortion occurred in the second vertical pattern 35, e.g., notching 36, at the intersection between the first pattern 34 and the second pattern 35. Such distortion, e.g., notching, was not due to optical proximity effects and caused an unacceptable variation in the critical dimension of the ultimate pattern formed in the underlying target layer.

Figure 4:
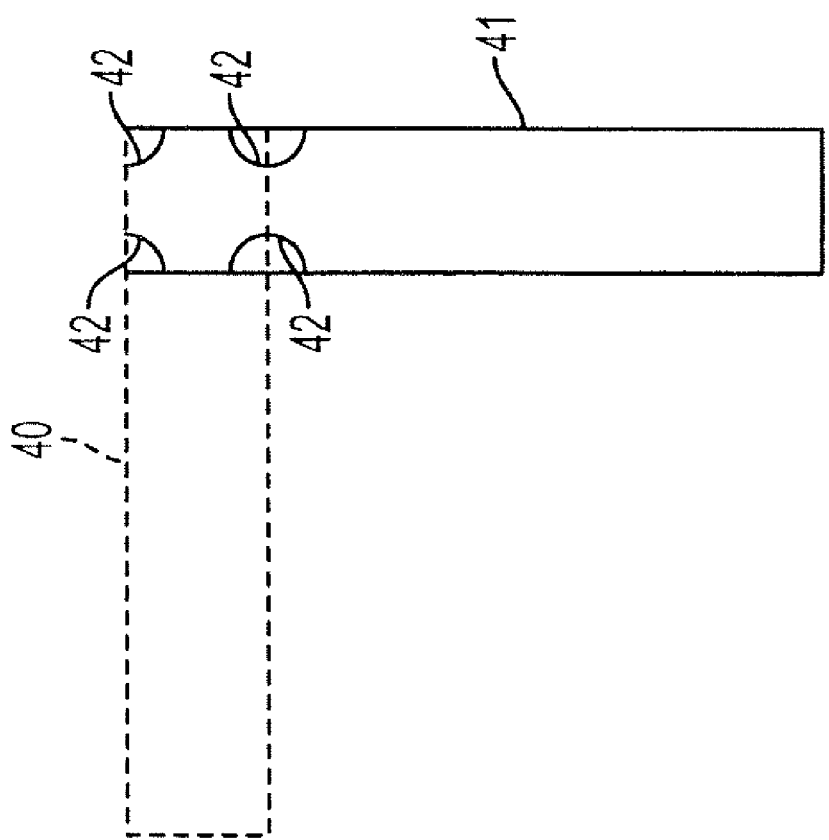
FIG. 4 schematically illustrates another double exposure technique encountering a distortion problem apart from optical proximity effects.

Similarly, as shown in FIG. 4, when a double exposure technique using multiple masks was implemented to form an intersecting line pattern similar to that illustrated in FIG. 2A, notching 42 occurred. Adverting to FIG. 4, a first mask pattern comprising horizontal component 40 was formed in a first resist layer over a target layer. A second mask pattern was formed over the first mask pattern comprising vertical component 41 using a multiple exposure technique. Although OPC was used to generate modified exposure reticles to form each mask pattern to address optical proximity effects, vertical component 41 was distorted, e.g., notched 42, at the intersection of the horizontal 40 and vertical 41 components.

Upon investigation, it is believed that the distortion encountered in multiple exposure techniques, such as the notching problem illustrated in FIG. 3F and FIG. 4, stems from the adverse impact of an underlying mask pattern on an upper mask pattern. It is believed that this problem is attributed to an increase in the elevation or change in topography at the intersection of the masks, thereby exceeding the depth of focus of the exposure tool, causing distortion in the upper photoresist mask, such as notching. A planarization layer can be applied between the first patterned resist layer and second resist layer to be patterned to reduce topographical geometric changes. However, this approach is limited by the thickness of the planarization layer. Moreover, the uneven topography would remain as the uneven distribution of refractive index from an underlying resist layer would perturb the second exposure process. Also the non-uniform develop and etch rate following a resist process also contribute to distortion in the final multiple exposure pattern.

Figure 5B:
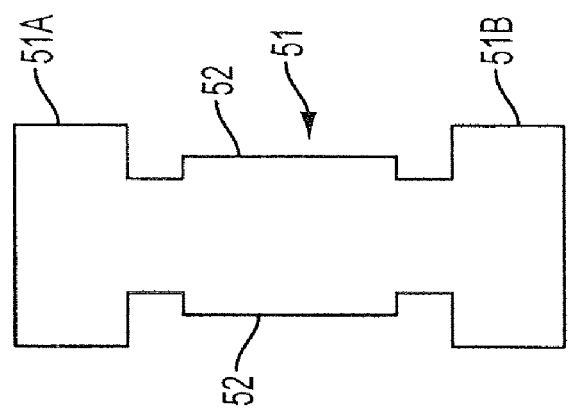
FIGS. 5A and 5B schematically illustrate exposure reticles for addressing the problem illustrated in FIG. 3F in accordance with an embodiment of the present invention.
Figure 5A:
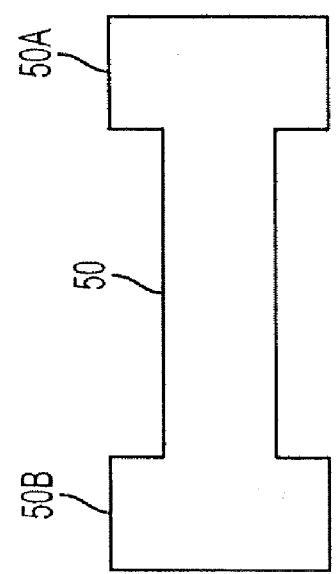

In accordance with embodiments of the present invention, the distortion in an upper mask caused by the presence of an underlying mask, particularly due to the impact of a change in topography, is addressed by conducting an additional OPC technique focusing at the intersection of the upper and lower masks. An embodiment of the present invention in forming modified exposure reticles to address this type of problem is illustrated in FIGS. 5A and 5B. Initially, a first modified exposure reticle 50 for the horizontal member of an intersecting line pattern, as illustrated in FIG. 5A, is formed employing a conventional OPC technique to address optical proximity effects. Modified exposure reticle 50 comprises enlarged end portions 50A and 50B to compensate for optical proximity effects. A second modified exposure reticle 52 is then formed employing OPC techniques to compensate for optical proximity effects resulting in elongated end portions 51A and 51B. However, in accordance with embodiments of the present invention, the adverse impact of the first mask on the second mask of the intersecting line pattern is taken into consideration. Such adverse impact is believed to result from the elevated topography at the intersection of the first and second mask pattern, thereby interfering with accurate resolution. Accordingly, a separate OPC correction technique is implemented at the intersection of the first and second mask patterns to compensate for such adverse impact, such as notching, which would otherwise result and, consequently, result in an ultimate design pattern having a variation in critical dimensions. By employing a separate OPC technique focused at the intersection of the mask patterns, a region 52 was generated in second modified exposure reticle 51, which region 52 eliminates notching in the vertical or upper mask pattern.

Figure 6B:
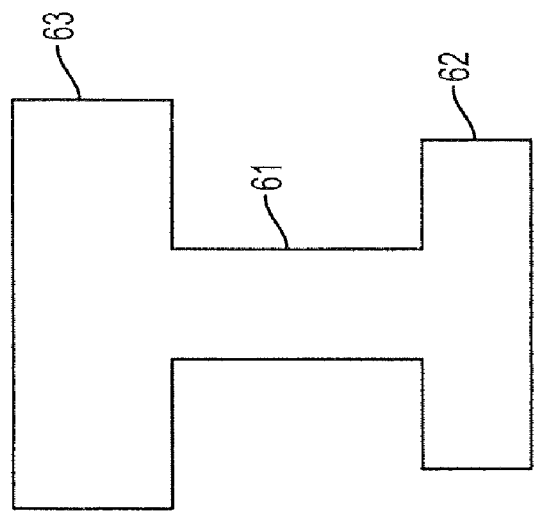
FIGS. 6A and 6B schematically illustrate exposure reticles in accordance with an embodiment of the present invention for addressing the problem illustrated in FIG. 4.
Figure 6A:
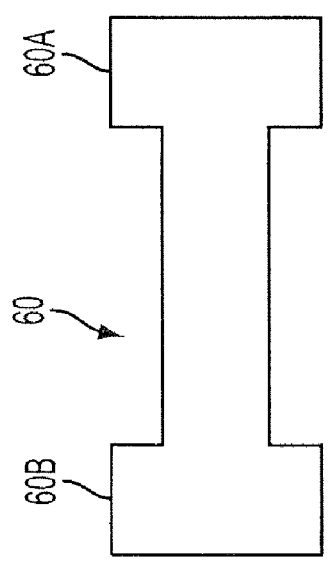

In accordance with another embodiment of the present invention, as illustrated in FIGS. 6A and 6B, the notching problem attendant upon the double exposure technique illustrated in FIG. 4 is addressed. A first modified exposure reticle 60, to form the horizontal component of the intersecting line mask pattern (horizontal component 40 in FIG. 4) is formed employing a conventional OPC technique to correct for optical proximity effects. The first modified exposure reticle 60 comprises enlarged end portions 60A and 60B. A second modified exposure reticle 61 for forming the vertical member (41 shown in FIG. 4) of the second mask pattern is then formed. In forming second modified exposure reticle 61, an OPC technique is employed to compensate for optical proximity effects resulting in an enlarged portion 62. If only the optical proximity effects are considered, a similar enlarged portion 62 would be formed at the opposite end. However, as a result of the adverse impact on the second photoresist mask by the underlying photoresist pattern containing horizontal component 64, a notching distortion 42 would occur regardless of addressing the optical proximity effects. In accordance with embodiments of the present invention, the adverse impact of the underlying first mask on the overlying mask is taken into account by employing a separate OPC technique focusing at the intersection of the mask patterns to generate greatly enlarged portion 63. The sequential use of the exposure reticles 60 and 61 in forming the pattern illustrated in FIG. 4 eliminates the notching problem 42.

In implementing embodiments of the present invention, conventional photoresist materials and techniques are otherwise employed. The present invention contemplates the formation of photoresist masks having a plurality of submask, wherein each submask is formed using a modified exposure reticle generated by an OPC technique which not only addresses optical proximity effects, but also addresses the distortion problem caused in a submask by an underlying submask, typically notching. Embodiments of the present invention can be employed to generate any type of pattern, including openings, such as the vias and/or contact holes having very small dimension. In such cases, typically at least three submasks are formed.

Figure 7B:
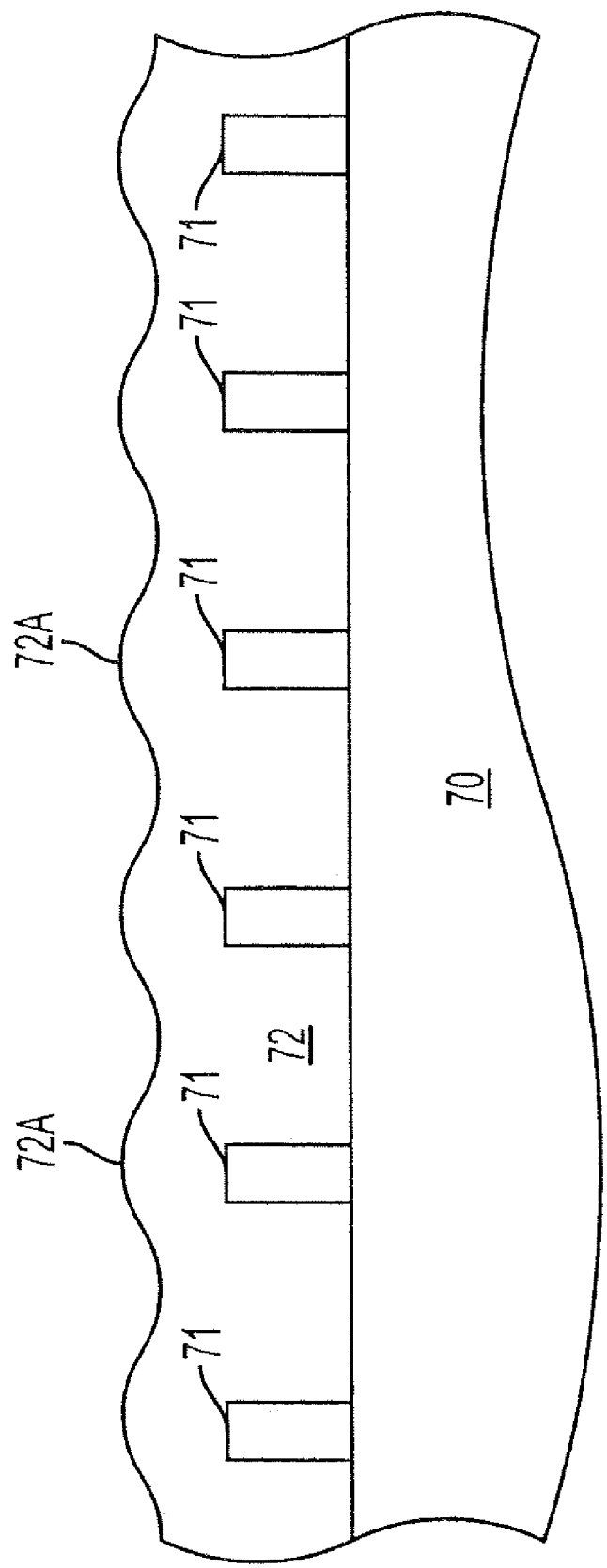
Figure 7C:
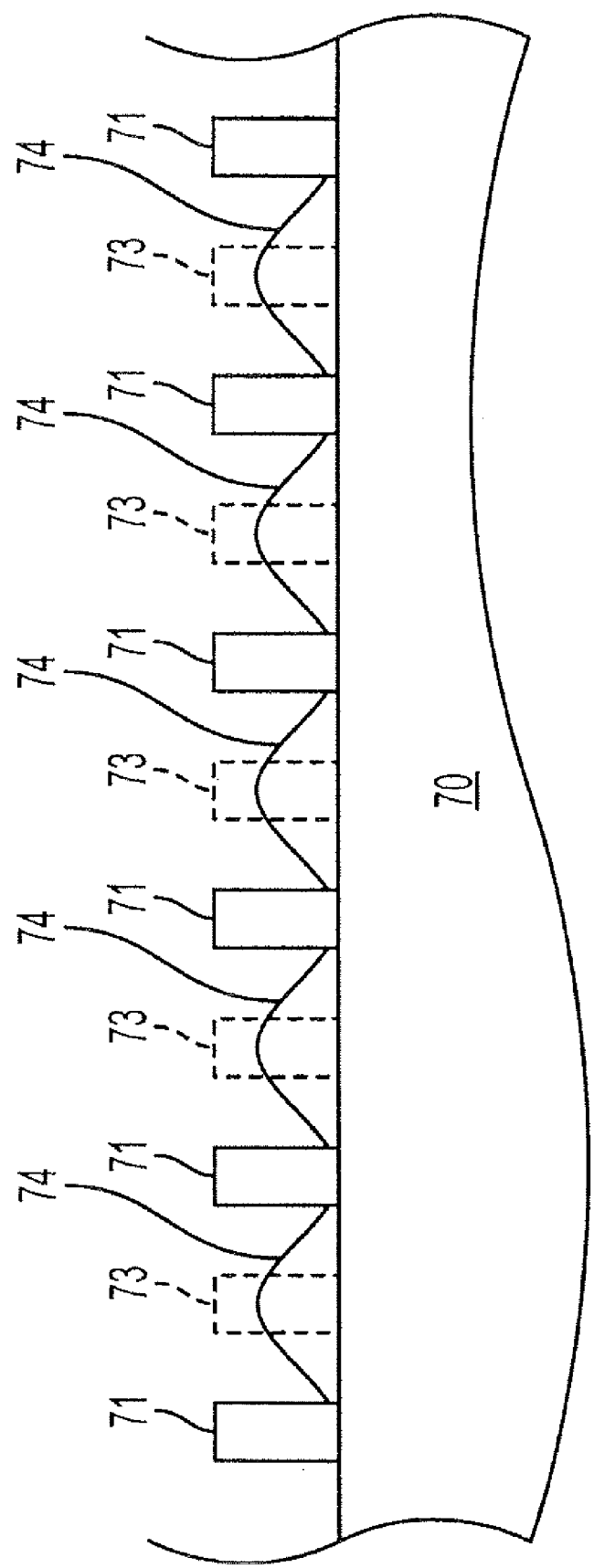

Embodiments of the present invention can be used to accurately form closely spaced apart lines. For example, adverting to FIG. 7A, conventional practices involve the formation of first photoresist mask pattern 71 over a target layer 70. A second photoresist layer 72 is deposited, as shown in FIG. 7B, and developed to form a second intended mask pattern illustrated by dashed lines 73 in FIG. 7C. However, the presence of the first photoresist pattern 71 causes elevations 72A in the second layer 72 shown in FIG. 7B, resulting in distortion of the second line pattern illustrated by solid lines 74 (FIG. 7C). Embodiments of the present invention can be used to address and correct that problem by employing a modified exposure reticle to form the second intended mask pattern 73 by implementing an OPC technique focusing on the elevated areas 72A shown in FIG. 7B, avoiding mask pattern 74.

The present invention can be employed in the fabrication of semiconductor chips comprising any of various types of semiconductor devices, including semiconductor memory devices, such as eraseable, programmable, read-only memories (EPROMs), electrically eraseable programmable read-only memories (EEPROMs), and flash eraseable programmable read-only memories (FEPROMs). Semiconductor chips fabricated in accordance with embodiments of the present invention can be employed in various commercial electronic devices, such as computers, cellular telephones and digital cameras, and can easily be integrated with printer circuit boards in a conventional manner.

The present invention enables the efficient fabrication of semiconductor chips comprising devices with accurate ultrafine design features with high manufacturing throughput. The present invention enjoys industrial applicability in fabricating semiconductor chips useful in any of various types of industrial applications, including chips having highly integrated semiconductor devices, including flash memory semiconductor devices exhibiting increased circuit speed.

In the preceding description, the present invention is described with reference to specifically exemplary embodiments thereof. It will, however, be evident that various modifications and changes may be made thereto without departing from the broader spirit and scope of the present invention, as set forth in the claims. The specification and drawings are, accordingly, to be regarded as illustrative and not as restrictive. It is understood that the present invention is capable of using various other combinations and embodiments and is capable of any changes or modifications within the scope of the inventive concept as expressed herein.

What is claimed is:

1. A method of fabricating a semiconductor device, the method comprising:
   forming a first mask pattern in a first mask layer over a target layer using a first exposure reticle;
   forming a second exposure reticle for a second mask pattern to be formed over the first mask pattern by implementing an optical proximity correction (OPC) technique to compensate for distortion of the second mask pattern caused by the first mask pattern at an intersection of the first and second mask patterns; and
   forming the second mask pattern in a second mask layer over the first mask pattern using the second exposure reticle.

2. The method according to claim 1, comprising:
   depositing a first photoresist layer over the target layer;
   forming a first photoresist mask pattern in the first photoresist layer using the first exposure reticle;
   depositing a second photoresist layer on the first photoresist mask pattern;
   forming a second photoresist mask pattern using the second exposure reticle, thereby forming a final mask pattern; and
   etching the underlying target layer to form a pattern using the final mask pattern.

3. The method according to claim 2, comprising forming the first exposure reticle using an OPC technique to compensate for optical proximity effects; and
   forming the second exposure reticle using an OPC technique to compensate for optical proximity effects and to compensate for distortion of the second photoresist mask pattern by the first mask pattern.

4. The method according to claim 3, wherein the second exposure reticle is formed by an OPC technique to compensate for notching of the second photoresist mask pattern caused by the first mask pattern.

5. The method according to claim 3, comprising etching the target layer to form a pattern of closely spaced apart lines.

6. The method according to claim 3, comprising etching the target layer to form a pattern comprising intersecting lines.

7. The method according to claim 3, wherein the target layer comprises a metal or a semiconductive material.

8. The method according to claim 4, comprising preserving the first photoresist mask pattern by an ultraviolet curing or baking technique before depositing the second photoresist layer thereon.

9. The method according to claim 1, comprising forming a third exposure reticle using an OPC technique to compensate for distortion of a third mask pattern by the underlying first and second mask patterns; and forming the third mask pattern over the first and second mask patterns using the third exposure reticle.

10. The method according to claim 9, comprising depositing a first photoresist layer over the target layer;
    forming the first mask pattern using a first exposure reticle;
    depositing a second photoresist layer on the first mask pattern;
    forming a second mask pattern on the first mask pattern using the second exposure reticle;
    depositing a third photoresist layer on the second photoresist layer;
    forming the third mask pattern on the second mask pattern using the third exposure reticle;
        wherein the first, second, and third mask patterns comprise a final photoresist mask pattern; and
    etching the underlying target layer using the final photoresist mask pattern.

11. The method according to claim 10, wherein the target layer comprises a dielectric material.

12. The method according to claim 11, comprising etching the target layer to form at least one via and/or contact hole.

13. A method of fabricating a semiconductor device, the method comprising:
    forming a photoresist mask over a target layer, the photoresist mask comprising a plurality of superimposed submasks; and
    forming an exposure reticle for a submask using optical proximity correction (OPC) to compensate for distortion of the submask caused by an underlying submask at an intersection of the submask and the underlying submask.

14. The method according to claim 13, further comprising forming an exposure reticle for each photoresist submask using OPC to compensate for optical proximity effects.

15. The method according to claim 14, comprising:
    forming a first submask over the target layer;
    forming additional submasks on the first submask; and
    forming an exposure reticle for each additional submask using OPC to compensate for distortion of each additional submask caused by underlying submasks.

16. A method of forming a composite photoresist mask over a substrate, the method comprising:
    forming a first photoresist submask over the substrate using a first exposure reticle;
    forming an additional exposure reticle for at least one superimposed additional photoresist submask using optical proximity correction (OPC) to compensate for distortion of the at least one superimposed submask by an underlying submask at an intersection of the at least one superimposed submask and the underlying submask; and
    forming the at least one superimposed additional photoresist submask on the first photoresist submask using the additional exposure reticle.

17. The method according to claim 16, further comprising:
    forming the exposure reticle for each photoresist submask using OPC to compensate for optical proximity effects; and
    forming each photoresist submask using the exposure reticle.

18. The method according to claim 17, comprising forming the first photoresist submask on the substrate;
    preserving the first photoresist submask pattern by ultraviolet curing or baking.

19. The method according to claim 16, comprising forming the photoresist mask comprising two photoresist submasks.

20. The method according to claim 16, comprising forming the photoresist mask comprising at least three photoresist submasks.

* * * * *